(12) United States Patent
Orleskie

(10) Patent No.: US 8,448,515 B2
(45) Date of Patent: May 28, 2013

(54) DIFFERENTIAL PRESSURE MEASURING PROBE WITH BOTTOMING INDICATOR

(75) Inventor: Charles T. Orleskie, Berthoud, CO (US)

(73) Assignee: Dieterich Standard, Inc., Boulder, CO (US)

( * ) Notice: Subject to any disclaimer, the term of this patent is extended or adjusted under 35 U.S.C. 154(b) by 621 days.

(21) Appl. No.: 12/640,414

(22) Filed: Dec. 17, 2009

(65) Prior Publication Data

US 2011/0146405 A1    Jun. 23, 2011

(51) Int. Cl.
*G01H 1/00* (2006.01)
*G01F 1/37* (2006.01)

(52) U.S. Cl.
USPC ....... 73/579; 73/861.42; 73/861.65; 73/866.5

(58) Field of Classification Search
USPC .............. 73/579, 587, 649, 659, 661, 861.42, 73/861.65, 861, 52, 861.18, 861.21, 861.23, 73/866.5, 861.52
See application file for complete search history.

(56) References Cited

U.S. PATENT DOCUMENTS

| | | | | |
|---|---|---|---|---|
| 4,631,683 A * | 12/1986 | Thomas et al. | ............... | 700/159 |
| 4,717,159 A * | 1/1988 | Alston et al. | ................... | 277/314 |
| 5,058,433 A * | 10/1991 | Wilson et al. | ................... | 73/651 |
| 5,060,522 A * | 10/1991 | Lew | ............................ | 73/861.02 |
| 5,152,181 A * | 10/1992 | Lew | ............................ | 73/861.02 |
| 6,164,143 A * | 12/2000 | Evans | ......................... | 73/861.65 |
| 2005/0217389 A1* | 10/2005 | Foster | ......................... | 73/861.22 |
| 2011/0107847 A1* | 5/2011 | Strom | ......................... | 73/861.24 |

* cited by examiner

*Primary Examiner* — Peter MacChiarolo
*Assistant Examiner* — Rose M Miller
(74) *Attorney, Agent, or Firm* — Westman, Champlin & Kelly, P.A.

(57) ABSTRACT

The present invention relates to a method and apparatus for determining the point at which the distal end of the bluff body sensor of an averaging pitot tube makes anchoring contact with the inside wall of a fluid conducting conduit during insertion of the bluff body into the conduit, which method includes monitoring the amplitude of vibrations generated in the bluff body in response to the fluid flowing in the conduit by the use of an accelerometer carried by the bluff body and an associated readout instrument connected to the output of the accelerometer for displaying data responsive to the output of the accelerometer and specifically indicating a change in the sensed amplitude values which change advises that the support mode of a bluff body inserted into the conduit has altered.

7 Claims, 3 Drawing Sheets

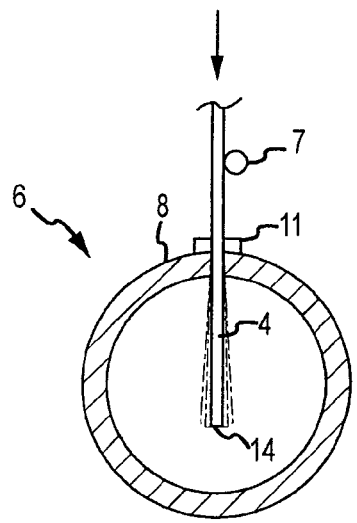
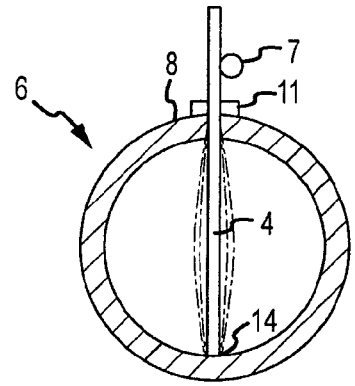
FIG.2    FIG.3
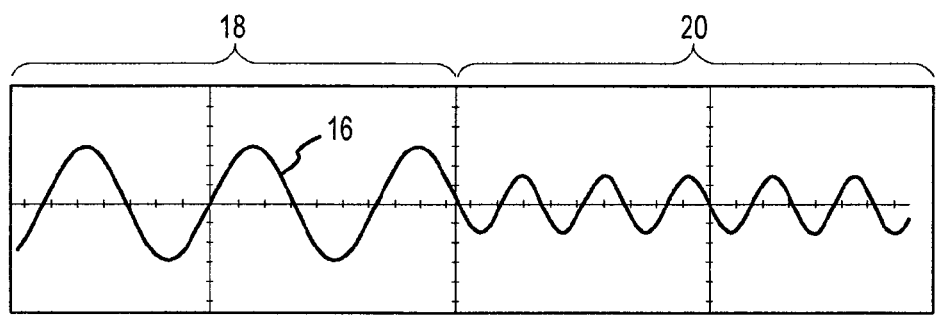
FIG.4

DIFFERENTIAL PRESSURE MEASURING PROBE WITH BOTTOMING INDICATOR

FIELD OF THE INVENTION

The present invention relates to a method and apparatus for determining the point at which the distal end of the bluff body sensor of an averaging pitot tube makes anchoring contact with the inside wall of a fluid conducting conduit during insertion of the bluff body into the conduit.

BACKGROUND OF THE INVENTION

It is often necessary to install a pitot tube type of fluid flow meter into a conduit while pressurized liquid or gas is flowing in the conduit. Apparatus has been designed to implement this type of installation, including, for example, the Rosemont 485 Annubar® Flanged Flo-Tap Assembly. In making use of this or similar apparatus to insert a sensor into a pressurized fluid conducting conduit it is extremely difficult to determine whether the bluff body sensor portion of the averaging pitot tube is completely inserted in the conduit, that is, inserted diametrically into the conduit so that the distal end of the bluff body sensor is in firm and stable contact with the inside surface of the conduit opposite the point of insertion. If not firmly seated against the wall of the conduit the sensor is subject to breaking. Conversely, the pitot tube sensor can be damaged if the insert-retract mechanism is over tightened during installation. One particular technique of the prior art utilizes colored markings on the sensor to visually indicate the distal end's approach to the far side of the conduit. Such a method however, lacks the finesse necessary to insure proper seating of the sensor or guard against damage during insertion. Another method involves sensing the change in torque applied to the insert mechanism. This method is unsatisfactory because the line pressure in the conduit affects the torque required to insert the sensor probe.

Accordingly, the primary object of the present invention is to establish a method and apparatus that will overcome the aforesaid difficulties encountered in the installation and proper monitoring of the operation of an averaging pitot tube type of fluid flow meter.

SUMMARY OF THE INVENTION

During insertion of a pitot tube bluff body through one wall of and into a fluid carrying conduit the bluff body assumes the character of a cantilevered beam that vibrates at its natural frequency with a first amplitude. When the distal end of the bluff body contacts the inside surface of the opposite conduit wall the bluff body becomes a beam that is supported at both of its ends and the amplitude of its vibration in the flowing fluid is reduced to approximately one half of the first amplitude of vibration of the cantilevered beam.

Utilizing the amplitude of the vibration of the bluff body, the present invention contemplates an accelerometer type of sensor, mechanically linked to the body of the pitot tube, which accelerometer will detect the amplitude of vibrations of the pitot tube bluff body during its installation into the fluid carrying conduit. When a change of amplitude is detected by either audible or visual electronic indications the operator of the insert mechanism will be made aware that the bluff body has been properly seated on the opposite wall of the conduit.

Thus, the method of the present invention of installing a pitot tube into a fluid carrying conduit can be reduced to the following steps:

inserting the elongated bluff body probe of the pitot tube diametrically into a fluid carrying conduit, sensing the amplitude of the fluid flow induced vibration of the bluff body, observing a first amplitude of vibration of the bluff body probe of the pitot tube, observing a second amplitude of vibration of the bluff body of the pitot tube, stopping the insertion upon observation of the said second amplitude.

DESCRIPTION OF THE DRAWINGS

FIG. 2 is a diagrammatic lateral cross sectional view of the fluid carrying conduit of FIG. 1 where the pitot tube bluff body is shown partially inserted into the conduit and functioning in a cantilever mode. The dashed lines represent the natural frequency vibrations of the bluff body caused by the flowing fluid in the conduit.

FIG. 3 is a similar diagrammatic view to that of FIG. 2 but showing the pitot tube bluff body fully inserted into the conduit where both the distal and proximal ends of the bluff body are secured in a pinned-pinned mode. The dashed lines represent the natural frequency vibrations of the bluff body caused by the flowing fluid in the conduit.

FIG. 4 is a diagrammatic showing of the natural frequencies of vibration of the bluff body of a pitot tube in the two mounting modes depicted in FIGS. 2 and 3, as might be seen on an oscilloscope that senses the output of the accelerometer sensor mounted on the pitot tube body.

DETAILED DESCRIPTION

Figure 1:
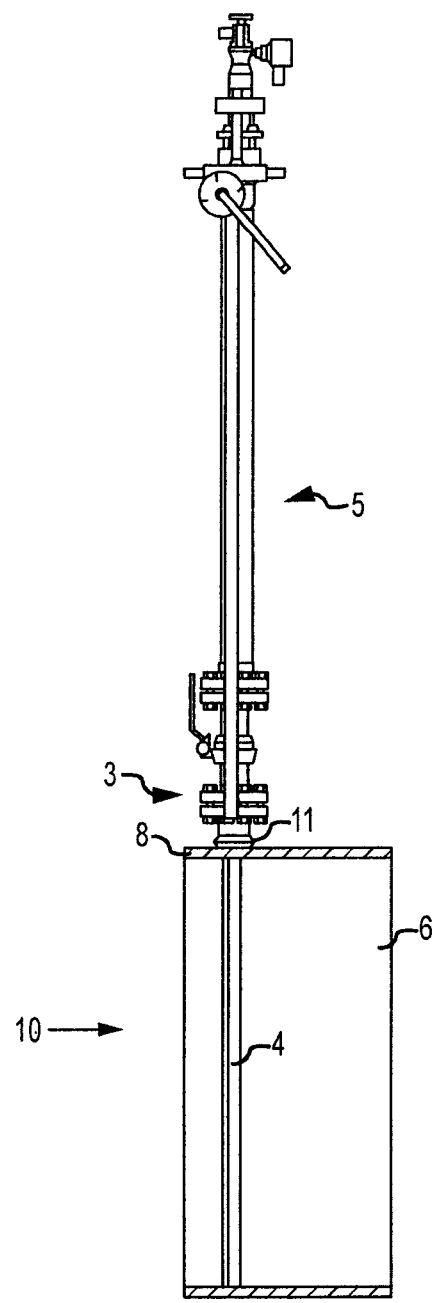
FIG. 1 is a fragmentary cross sectional side view of a fluid carrying conduit having a pitot tube type of fluid flow meter inserted therein with an attached insert-retract mechanism such as the Rosemont 485 Annubar® Flanged Flo-Tap assembly.

Referring first to FIG. 1, a pitot tube type of fluid flow meter 3 is shown installed in a fluid carrying conduit 6. The direction of fluid flow is shown by arrow 10. The bluff body probe 4 of the pitot tube is positioned diametrically of the conduit 6, having been inserted into the conduit by an insert-retract mechanism 5 through an opening in wall 8 of the conduit.

Figure 5:
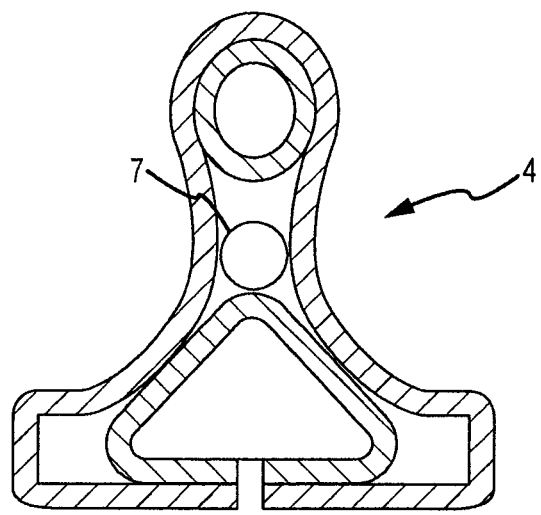
FIG. 5 is a lateral cross sectional view of a differential pressure measurement probe of the type described in U.S. Pat. No. 6,321,166, showing an alternative form of mounting the accelerometer within the bluff body of the pitot tube.

FIGS. 2, 3 and 4 illustrate the natural vibration of the bluff body 4 during the two phases of insertion of the bluff body into the conduit 6. The first phase of insertion is where the bluff body slides through a pipe fitting 11 welded to the conduit in a position surrounding the opening in the pipe through which the bluff body is inserted. The close contact between the bluff body and the pipe fitting during the insertion stabilizes the portion of the bluff body that is in contact with the pipe fitting. As the bluff body is being inserted into the conduit, the point of bluff body contact with the pipe fitting (referred to herein as the proximal end 12) moves. That portion of the bluff body which extends into the conduit during insertion becomes a cantilevered beam having a distal end 14. An accelerometer 7 senses the amplitude of the vibration 16 of the cantilevered bluff body and is depicted over a period of time 18 in FIG. 4. One example of a suitable accelerometer is the ICP® accelerometer, model 352C68 manufactured by PCB Piezoelectronics. The accelerometer 7 may be mechanically linked in any way with differential pressure measuring probe 4 so long as the mechanical linkage is sufficiently rigid to accurately transfer vibrations from the probe to the accelerometer. In the preferred embodiment, the accelerometer 7 is mounted inside the probe 4, as shown in FIG. 5. In an alternative embodiment, accelerometer 7 is mounted to an exterior surface of the pitot tube probe, as shown diagrammatically in FIGS. 2 and 3. Other mounting embodiments representing the rigid mechanical linkage are also acceptable.

When the distal end 14 of the bluff body 4 contacts the inside surface of the conduit 6, as shown in FIG. 3, the second phase of insertion has been reached. In the second phase when the distal end of the bluff body is stabilized by being firmly seated against the conduit wall the cantilever character of the beam changes to a pin-pin mode and the amplitude of vibration of the bluff body decreases, as depicted in time interval 20 in FIG. 4. The point in time between time intervals 18 and 20 is the point where the distal end 14 of the bluff body 4 makes firm contact with the opposing conduit wall.

Figure 6:
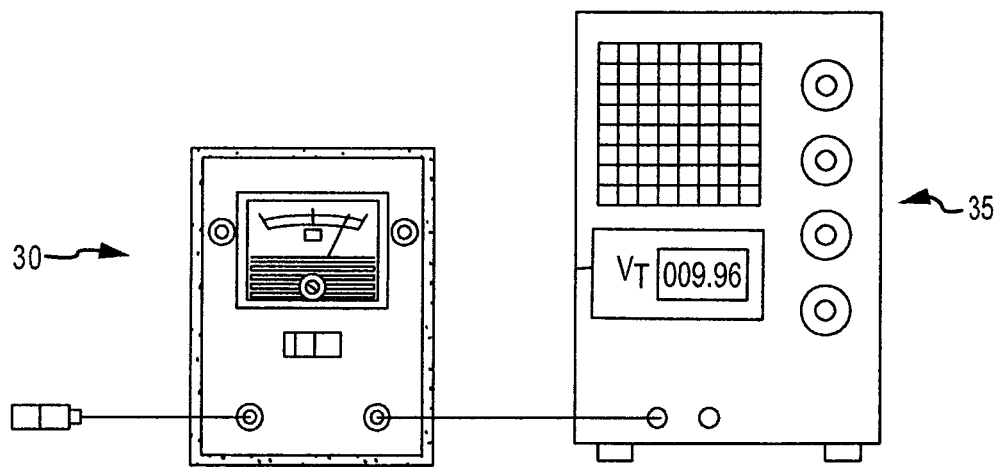
FIG. 6 is a diagrammatic depiction of a typical electronic system for displaying the indications developed by an accelerometer, such as the one depicted in FIGS. 2, 3 and 5.

FIG. 6 diagrammatically depicts a typical arrangement for displaying or indicating the output of the accelerometer 7 where a signal conditioner 30 is connected to the output of the accelerometer and its output is then visually indicated by a readout instrument 35. Such electronic hook ups are detailed by the manufacturer of the accelerometer.

What is claimed is:

1. A system for indicating contact between an inner wall of a fluid conducting conduit and the distal tip of a pitot tube probe of a differential pressure flow meter, comprising:
   a fluid flow meter having a probe adapted for insertion into a fluid carrying conduit,
   accelerometer means mechanically linked to the differential pressure measuring probe and having an output,
   indicator means in communication with the output of the accelerometer means for indicating the vibration amplitude of the probe.

2. The system of claim 1 wherein the accelerometer means is mounted inside the measuring probe.

3. The system of claim 1 wherein the accelerometer means is mounted on the outside surface of the measuring probe.

4. A method for determining the support mode of a pitot tube of a flow meter inserted into a fluid carrying conduit, comprising the steps of:
   diametrically inserting the pitot tube into a fluid carrying conduit by axial movement thereof,
   sensing the amplitude of induced vibration in the pitot tube,
   detecting a first vibration amplitude of the pitot tube,
   detecting a second vibration amplitude of the pitot tube, the second vibration amplitude being different then the first vibration amplitude detected,
   stopping the insertion of the pitot tube upon detection of the said second vibration amplitude.

5. The method of claim 4 where the second amplitude is smaller than the first amplitude.

6. A system for monitoring the amplitude of vibrations generated in a pitot tube of a fluid flow, comprising:
   a conduit for carrying flowing fluid and having a wall, including means for mounting the flow meter within the wall,
   an accelerometer having an output and carried by the pitot tube, said accelerometer configured to generate an electrical signal in response to the amplitude of the vibrations created in the pitot tube responsive to the fluid flowing in the conduit over the pitot tube inserted into the conduit and,
   indicator means connected to the output of the accelerometer for generating an indication responsive to the output of the accelerometer.

7. The system of claim 6 where the accelerometer senses the amplitude of vibrations of the pitot tube and the indicator is configured to indicate when the sensed amplitude changes values, indicating that the support mode of the pitot tube inserted into the conduit has changed.

* * * * *